Figure 1:
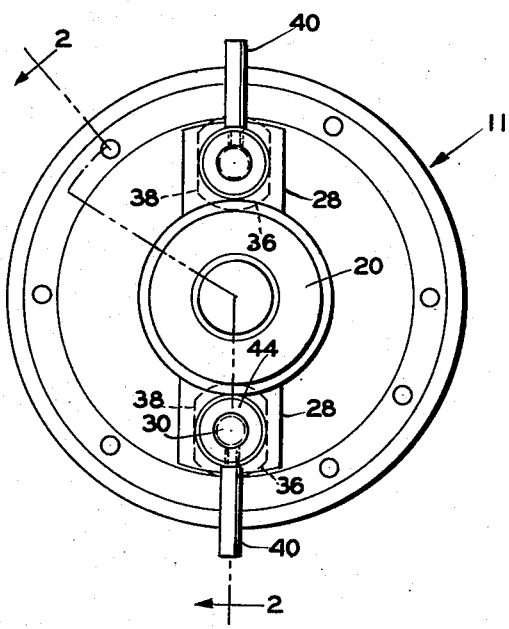

Oct. 15, 1957     L. LONGDEN     2,809,795
HOLDING DEVICE
Filed June 5, 1952

INVENTOR.
LAWRENCE LONGDEN
BY
C. R. Miranda
ATTORNEY

# United States Patent Office 2,809,795
Patented Oct. 15, 1957

2,809,795

HOLDING DEVICE

Lawrence Longden, Glen Rock, N. J., assignor to Bendix Aviation Corporation, Teterboro, N. J., a corporation of Delaware Application June 5, 1952, Serial No. 291,934

4 Claims. (Cl. 248—27)

This invention relates to holding devices and more particularly to a device for rigidly clamping an object.

In devices for holding objects, it is of extreme importance to provide clamping means which prevent deformation of the surface of the object. This is especially true in the case of inductive devices, such as "synchros," for example, where any deformation in the stator housing results in change of electrical characteristics to cause error in operation.

The present invention, therefore, contemplates a holding device wherein novel clamping means are provided for rigidly mounting an object. The clamping means comprises a dog member having a clamping portion which is movable into and out of a groove formed in the object. Means are provided for longitudinally displacing the dog member so as to move the clamping portion into engagement with a wall of the groove to rigidly mount the object.

An object of the present invention, therefore, is to provide a novel device for rigidly holding an object.

Another object is to provide novel means for rigidly holding an object without deforming the surface thereof.

A further object is to provide a novel holding device wherein a dog member adapted for angular and longitudinal displacement has a clamping portion formed thereon which is movable into and out of a groove formed in an object to be mounted, means being provided to move the clamping portion into engagement with a wall of the groove without deforming the surface of the object.

The above and other objects and advantages of the present invention will appear more fully hereinafter from a consideration of the detailed description which follows taken together with the accompanying drawing wherein one embodiment of the invention is illustrated.

Figure 2:
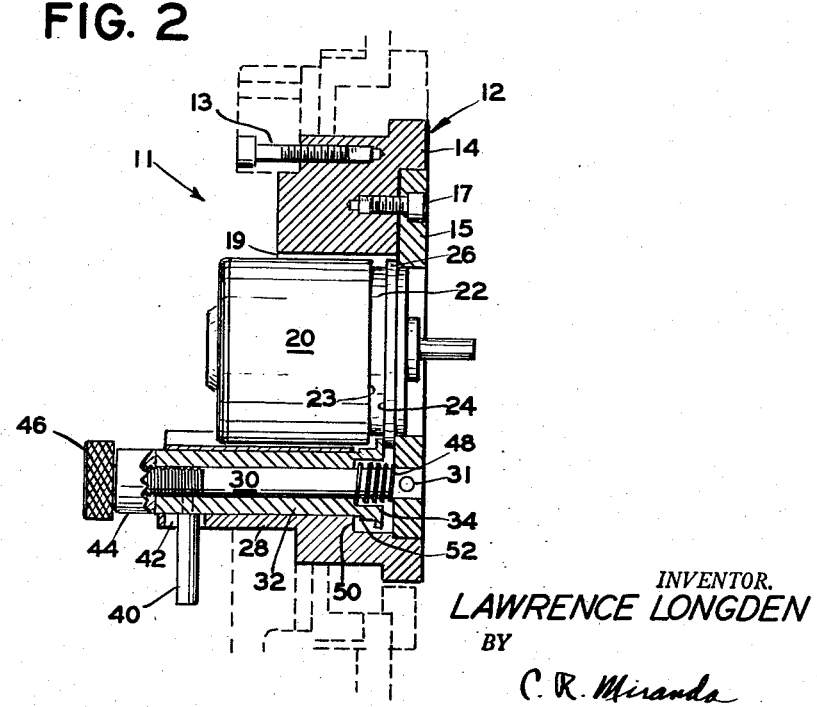

In the drawing, wherein like reference characters refer to like parts throughout both views;

Fig. 1 is a front view, in elevation, of the holding device embodying the present invention; and Fig. 2 is an elevational view of the holding device in section, taken along line 2—2 of Fig. 1.

Referring now to the drawing for a more detailed description of the present invention, and more particularly to Fig. 2 wherein one embodiment hereof is clearly illustrated, a holding device, generally designated by the numeral 11, is shown as comprising a base 12 fixedly mounted as by screws 13 (one shown) to a pedestal support, a portion of which is shown in phantom view. Base 12 includes an annular member 14 and a disc 15 secured together by a plurality of screws 17, one of which is shown in Fig. 2.

Annular member 14 has an opening 19 formed therein which is of suitable size to accommodate an object to be held, such as synchro 20, for example, shown in Fig. 2. Formed on the housing of synchro 20 is an annular groove 22 which is defined by a pair of walls 23 and 24. Wall 24 forms part of a shoulder 26 which abuts a shoulder formed on disc 15 so as to seat synchro 20 on base 12. Formed integrally with annular member 14 are a pair of diametrically opposed tubular extensions 28 (one of which is shown in Fig. 2) which are arranged adjacent opening 19, and each extension accommodates a rod 30 fixed at one end to disc 15 by a pin 31.

Positioned on rod 30 and extending through each extension 28 is a hollow and tubular dog member 32 which has formed at one end a clamping portion or dog 34. Clamping portion 34 includes a pair of diametrically opposed arcuate edges 36 (seen in broken lines in Fig. 1) and a pair of parallel arranged straight edges 38. Each dog member has threadedly secured thereto an operating handle 40 which is manually operable to rotate dog member 32. Handle 40 extends through a slot 42 cut in extension 28, the dimensions of the slot being such as to limit the travel of the handle to 90 degrees.

Rod 30 is threaded on the end adjacent handle 40 to accommodate an adjusting member 44 which is internally threaded. Member 44 has a knurled portion 46 and rotation thereof in the proper direction longitudinally displaces dog member 32 along the rod and against the biasing force exerted by a helical spring 48 arranged on the rod. The dimensions of slot 42 are such as to provide for longitudinal travel of member 32 without interference, as by handle 40 contacting the walls of the slot. It may be seen from Fig. 2 that if adjusting member 44 is "backed-off," spring 48 moves dog member 32 to the left. Means are provided for limiting movement of dog member 32 to the left, and comprise a pair of shoulders 50 and 52 formed on extension 28 and dog member 32, respectively. The purpose of shoulders 50 and 52 will be brought out presently.

Considering now the operation of the holding device 11, when it is desired to remove synchro 20, each adjusting member 44 is "backed-off" whereupon spring 48 moves dog member 32 to the left; movement of dog member 32 being arrested when shoulder 52 engages shoulder 50. The width of groove 22 is such that when shoulders 50 and 52 engage, a very small clearance exists between wall 23 and clamping portion 34. The lower handle 40 (as seen in Figure 1) is rotated 90 degrees in a counterclockwise direction from the position shown, while upper handle 40 is rotated 90 degrees in a clockwise direction. When the handles 40 have been rotated, it may be understood that arcuate edges 36 of clamping portion 34 move out of groove 22 of synchro 20 to thereby permit removal of the synchro.

With arcuate edges 36 displaced 90 degrees from the positions shown in Figs. 1 and 2, another or the same synchro may be inserted into opening 19 of annular member 14 without interference. Engagement of shoulder 26 with the shoulder on disc 15 positions groove 22 immediately above dog 34. Handles 40 are then rotated to move arcuate edges 36 into the groove after which adjusting member 44 is rotated to axially displace dog member 32 to the right. In axially displacing dog member 32, arcuate edges 36 are brought into engagement with wall 24 of the groove to thereby rigidly clamp the synchro to the base. It may be seen that marring of wall 23 by arcuate edge 36 is prevented when the latter is moved into groove 22 because shoulders 50 and 52 provide for a small clearance between wall 23 and arcuate edge 36 when handles 40 are rotated to operation position. Adjusting member 44, besides effecting clamping of the synchro also serves as a locking member to maintain dog member 32 in clamping position.

It now will be understood that the foregoing construction provides a novel and effective holding device for rigidly clamping an object having a groove. By properly proportioning the width of the groove and the thickness of the arcuate edges, and by applying the clamping force against shoulder 26, marring and deformation of the surface of the object are prevented.

Although one embodiment of the invention has been illustrated and described in detail, it is to be expressly understood that the invention is not limited thereto. Various changes can be made in the design and arrangement of parts without departing from the spirit and scope of the invention as the same will now be understood by those skilled in the art.

I claim:

1. In a device for clamping a precision instrument within and against a support, a rod fixed with relation to the support, a cylindrical sleeve rotatably and slidably mounted on the rod, a housing connected to the support and extending around and fitting the outer face of the sleeve, a clamping dog carried by the sleeve and movable into and out of register with the instrument by rotation of the sleeve, first manually operable means engaging the sleeve and rod for shifting the sleeve endwise in the housing and bringing the dog into clamping engagement with the instrument so as to secure the instrument within the support, and second manually operable means projecting through said housing to rotate the sleeve so as to move the clamping dog into and out of register with the instrument.

2. In a device for clamping a precision instrument within and against a support, a rod fixed to the support, a cylindrical sleeve rotatably and slidably mounted on the rod, a housing connected to the support and extending around and fitting the sleeve, a clamping dog carried by the sleeve and movable into and out of register with the instrument by rotation of the sleeve, means engaging the sleeve and rod for shifting the sleeve endwise and bringing the dog into clamping engagement with the instrument so as to secure the instrument within the support, means for limiting the movement of the sleeve away from the instrument, comprising an abutment on the sleeve and an associated abutment on the housing, said abutment on the sleeve including manually operable means extending laterally beyond the housing and in position for manual manipulation to rotate the sleeve so as to move the clamping dog into and out of register with the instrument positioned within the support.

3. In a device for clamping a precision instrument within and against a support, a rod fixed with relation to the support, a cylindrical sleeve rotatably and slidably mounted on the rod, a housing connected to the support and extending around and fitting the sleeve, a clamping dog carried by the sleeve and movable into and out of register with the instrument by rotation of the sleeve, means engaging the sleeve and rod for shifting the sleeve endwise and bringing the dog into clamping engagement with the instrument so as to secure the instrument within the support, a member fixed to the sleeve and extending laterally beyond the housing in position for manual rotation of the sleeve to move the clamping dog into and out of register with the instrument, and stops for said member carried by the housing.

4. In a device for clamping a precision instrument within and against a support, a rod fixed with relation to the support, a cylindrical sleeve rotatably and slidably mounted on the rod, a clamping dog carried by the sleeve and movable into and out of register with the instrument by rotation of the sleeve, means engaging the sleeve and rod for shifting the sleeve endwise and bringing the dog into clamping engagement with the instrument so as to secure the instrument within the support, other means to rotate the sleeve to move the clamping dog into and out of register with the instrument, and means for biasing the dog away from the instrument, including a coil compression spring surrounding the rod and extending into a recess in the sleeve, said spring abutting the support at one end and the sleeve at the other end so as to bias the sleeve away from the support.

References Cited in the file of this patent

UNITED STATES PATENTS

| | | |
|---|---|---|
| 783,099 | Bryant | Feb. 21, 1905 |
| 881,209 | Taylor | Mar. 10, 1908 |
| 928,657 | Howell | July 20, 1909 |
| 1,803,211 | Schlaich | Apr. 28, 1931 |
| 1,835,728 | Urfer | Dec. 8, 1931 |
| 2,057,885 | Douglas | Oct. 20, 1936 |
| 2,609,005 | Booth | Sept. 2, 1952 |